Aug. 26, 1958  F. W. KENDALL  2,848,786
MEANS FOR FEEDING BAR STOCK IN AUTOMATIC MACHINE TOOLS
Filed May 1, 1956  5 Sheets-Sheet 3
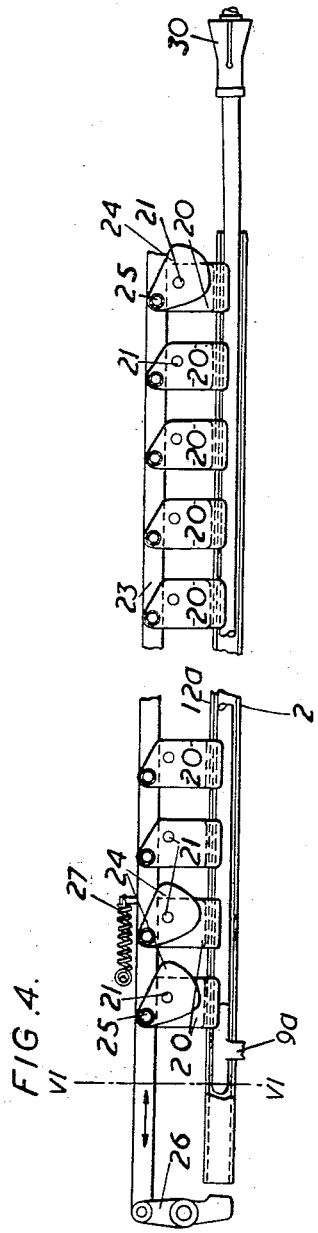
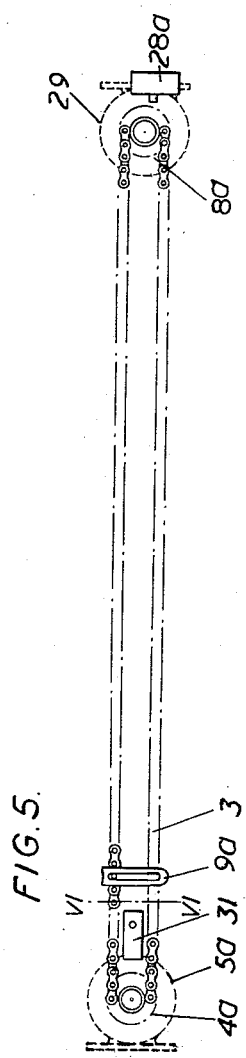
*Inventor*
Frederick W. Kendall
By
CA Snow & Co. *Attorneys.*

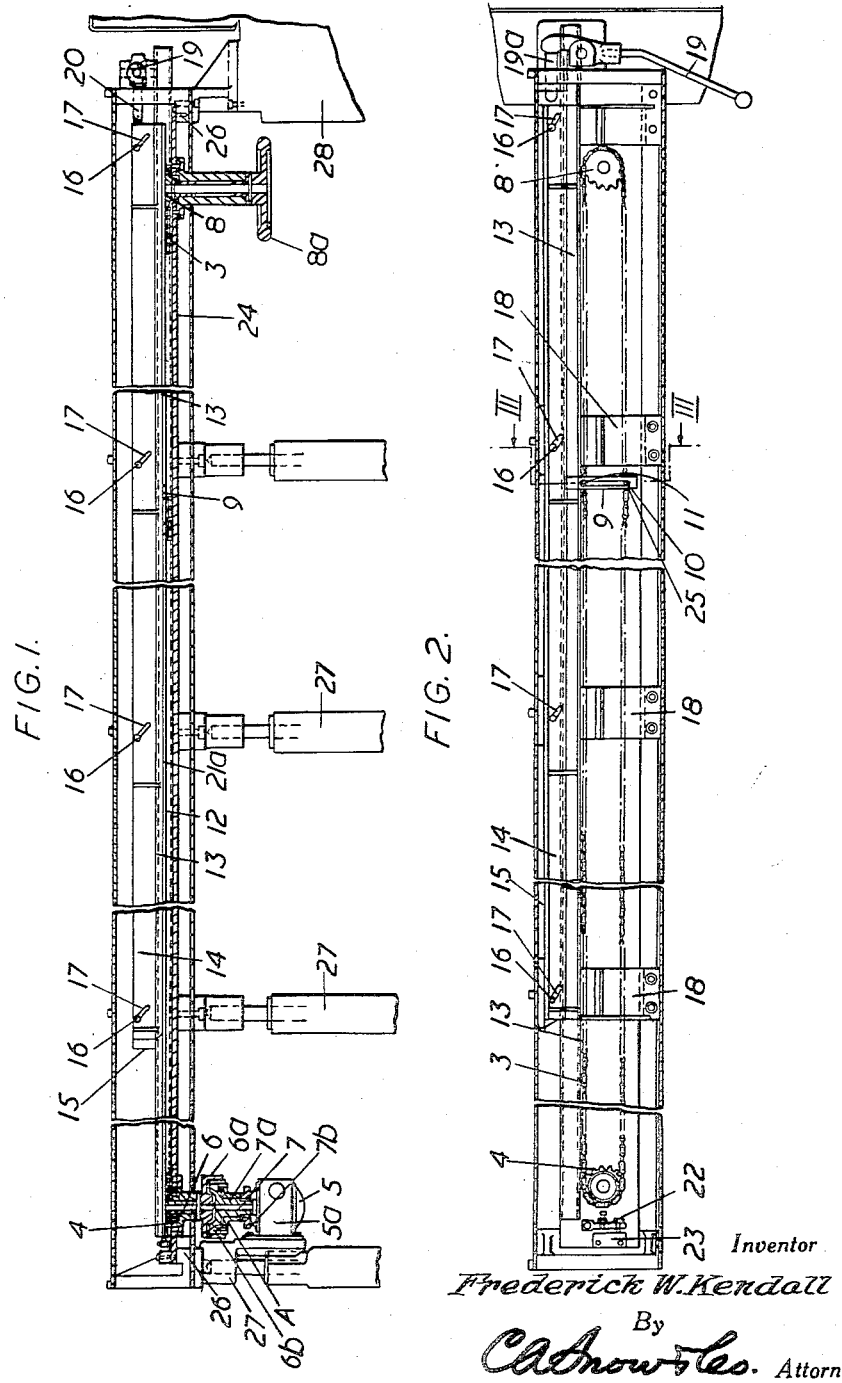

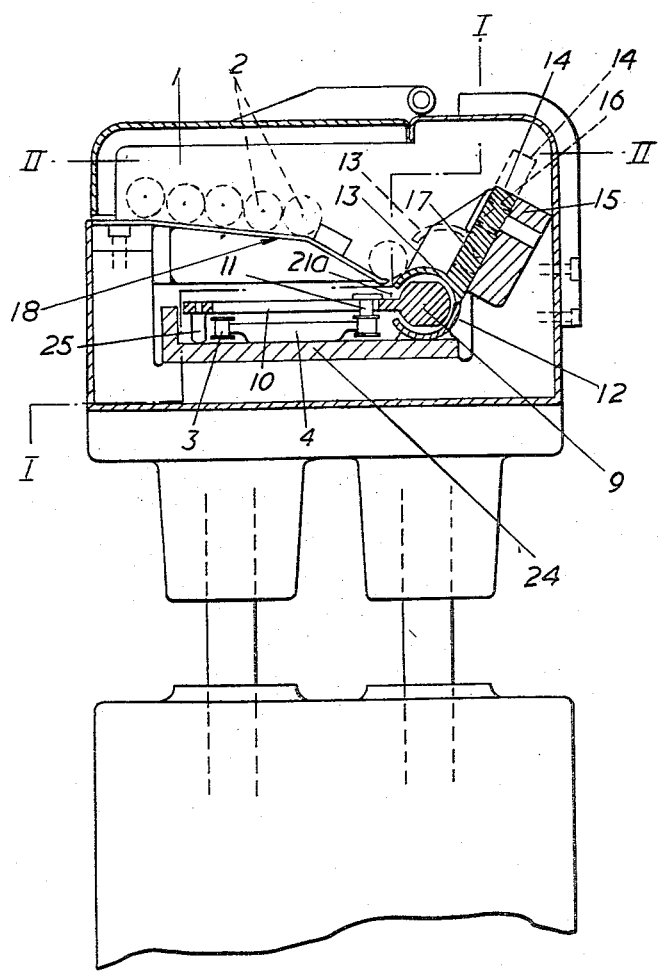

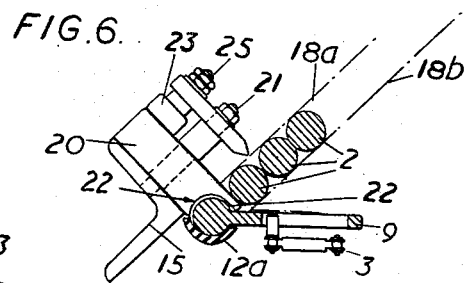
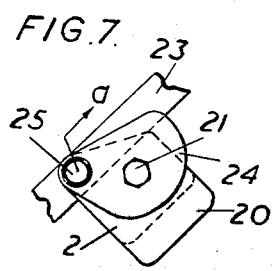
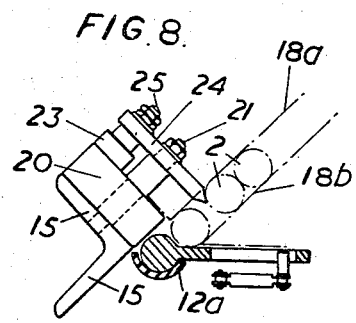
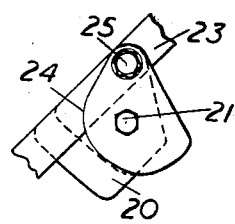

Aug. 26, 1958 F. W. KENDALL 2,848,786
MEANS FOR FEEDING BAR STOCK IN AUTOMATIC MACHINE TOOLS
Filed May 1, 1956 5 Sheets-Sheet 5

Inventor
*Frederick W. Kendall*
By
*C. A. Shurtleff* Attorney

United States Patent Office 2,848,786
Patented Aug. 26, 1958

2,848,786
MEANS FOR FEEDING BAR STOCK IN AUTOMATIC MACHINE TOOLS

Frederick William Kendall, Leamore, Walsall, England

Application May 1, 1956, Serial No. 585,132

5 Claims. (Cl. 29—93)

This invention relates to automatic means for feeding bar stock to automatic lathes or like machine tools which include a hollow rotating spindle in the head of the machine through which the bar stock is fed against a stop, the hollow rotating spindle having a collet with an opening and closing movement to grip and release the bar stock, the said automatic means being of the known type having a bar feed guide and means for feeding the bar comprising an endless chain.

This invention has for its object a simplified means of obtaining a step by step feeding means. A further object is to obtain a quick return movement of the feeding device in a simplified manner. A further object is to provide simplified means for enabling a bar stock to be fed to a bar feed guide.

Referring to the drawings:

Figure 1 is a section on line I—I of Figure 3, of a bar feed device constructed according to this invention.

Figure 2 is a section on line II—II of Figure 3.

Figure 3 is a section on line III—III of Figure 2.

Figure 4 is a face view of a bar feed guide and bar retainers and selectors which replace the bar feed guide and bar retainer or cover shown by Figures 1 to 3.

Figure 5 is a plan view of the chain of a pusher device, showing electric motors driving the chain and control switches for the electric motors.

Figure 6 is a cross section on line VI—VI of Figures 4 and 5 showing the parts in position for feeding a bar.

Figure 7 is a face view of a bar retainer and bar selector in the position shown by Figure 6.

Figure 8 is a similar view to Figure 6 showing the bar retainer and bar selector in position for a bar to fall into the bar feed guide.

Figure 9 is a face view of the bar retainer and bar selector in the position shown by Figure 8.

Figure 10:
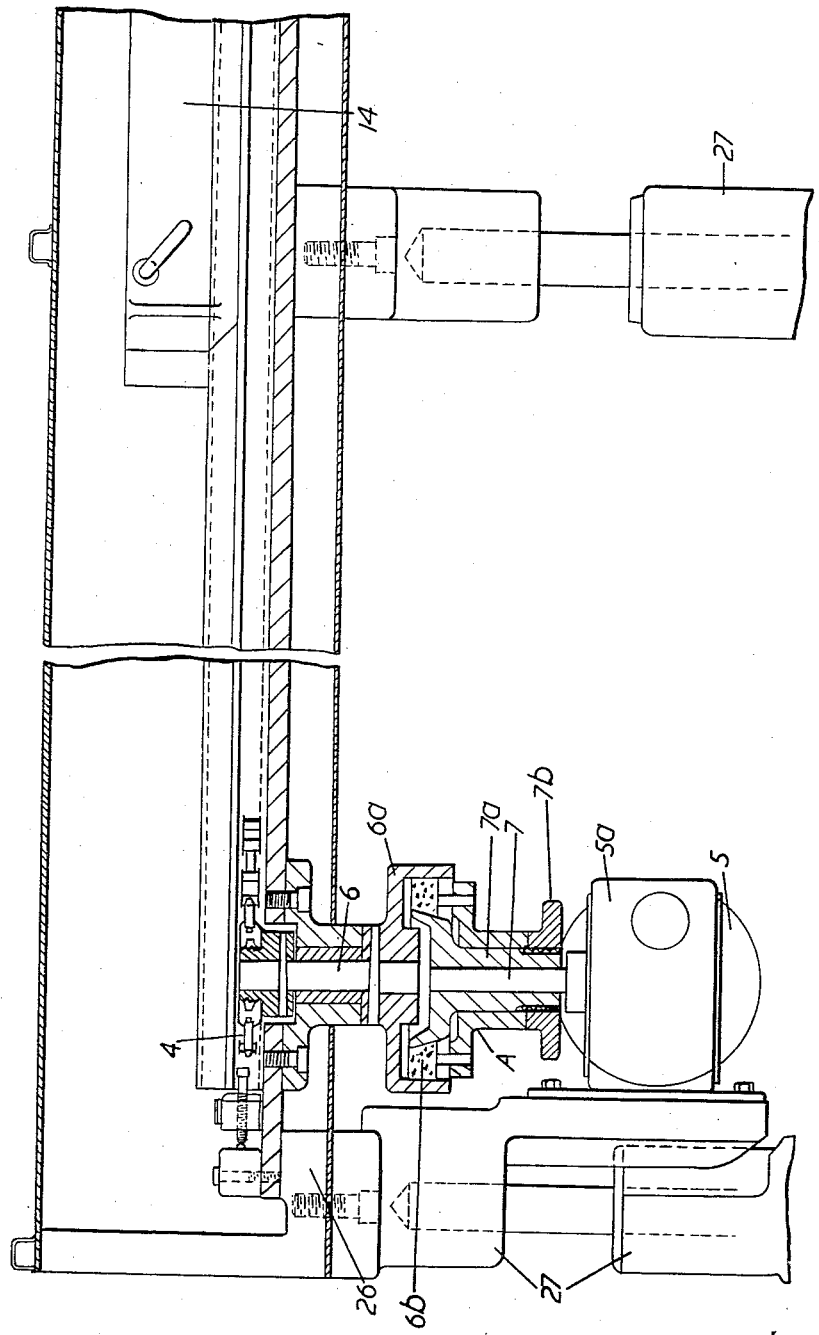
Figure 10 is an enlarged view of the slipping clutch shown by Figure 1.

According to a convenient embodiment of this invention, as shown by Figures 1 to 3, the feed device comprises a magazine 1 for bars 2 and an endless chain 3 is mounted therein and the driving chain sprocket wheel 4 is driven by an electric motor 5 through the medium of an adjustable slipping clutch A driving the chain sprocket wheel spindle 6. The friction clutch comprises a clutch member 6a mounted on the spindle 6 and a clutch member 7a mounted on the spindle 7 driven by the motor 5 through the gear box 5a. The clutch ring 6b is adjustably wedged between the clutch members 6a and 7a by the adjusting ring 7b screwed on the stem of the part 7a. The slipping clutch transmits sufficient power to drive the chain and feed a bar when it is free to move, but allows the electric motor to run without transmitting power to drive the chain when the bar is held against an abutment. The chain sprocket wheels 4 and 8 are mounted to rotate about vertical axes and a transverse pusher 9, forming with the chain 3 a pusher device. The pusher 9 has a slot 10 therein which engages a pin 11 on a chain link and is reciprocated backwards and forwards, the pin travelling along the slot as it passes around the sprocket wheels. The head on the pusher 9 and the pin 25 retain the pusher over the two runs of the chain 3 and as shown by Figure 3 the pin 11 is at the radius of the chain sprocket wheels, and will travel along the slot 10 as it passes around the sprocket wheel. A bar 2 to be fed is placed in a feed guide 12, the upper portion or retainer 13 of which is adapted to open to receive a bar 2. When the bar 2 is fed to a machine tool it is held in a collet and the bar is rotated whilst a portion is cut therefrom and the retainer 13 holds the bar in the feed guide whilst it is rotated. For this purpose, the upper portion 13 is carried by a slide bar 14 mounted a fixed inclined slide guide 15. Pins 16 on the slide guide 15 engage inclined slots 17 in the slide bar 14, so that when the side bar is pushed endwise it slides on the pins 16 to raise the cover portion 13 upwardly and outwardly (as shown by dotted lines Figure 3) to permit a rod 2 to slide down the inclined ramps 18 arranged at intervals along the magazine into the slide guide 12. The slide bar 14 is operated by means of a hand lever 19 which presses a plunger 19a against the slide bar. When the lever is released, the slide bar falls by gravity to replace the cover portion 13.

The pusher 9 passes through a slot 21a in the feed between the guide 12 and the cover 13 and has a shaped end slidable in the guide for engaging the outer end of the bar stock 2 to be fed through the feed guide 12 and when the bar stock is moved forward to the usual stop of a machine tool, the clutch A slips and the chain is not driven until the stop is moved to permit of the next feed movement of the bar 2. At the end of the feed, the pusher 9 travels back on the return run in the feed guide 12 and at the end of the run presses a lever 22 to operate a switch 23 to stop the motor 5 driving the chain and to switch on a light warning the machine operator that a fresh bar is required to be placed in the feed guide 12. The bars are stored on the inclined ledge 18 in the magazine for rolling into the feed guide.

The bar for lifting the cover of the guide tube can be operated by a solenoid energised by a switch operated by the pusher at the end of the return run. The sprocket 8 can be rotated by hand wheel 8a to adjust the position of the pusher 9 by hand. The chain wheels 4 and 8 are mounted on a longitudinal frame plate 24 which supports the chain and the pusher 9 is slidable on the plate by means of the leg 25. The frame plate 24 is fixed to end brackets 26, one of which is fixed to a floor support member 27 to be adjustable in height whilst the other bracket is fixed to a machine tool 28, intermediate floor supports being also provided.

According to a modified form of the invention as shown by Figures 4 to 9, the bars 2 are automatically fed from the magazine to the bar feed guide or channel 12a. A bar 2 is retained in the channel 12a by means of a series of bar retainers 20 which are pivotally mounted on pins 21 on the stationary frame bar 15a, at one side of the magazine (similar to magazine 1 of Figure 3) and replacing the slide guide 15 of Figure 3, and the bottom edges of the retainers 20 are curved at 22 to form cover members for retaining a bar in the channel of the feed guide 12a. A plurality of retainers 20 are arranged at intervals along the magazine and are connected by a connecting rod 23 which when moved in the direction of the arrow a (Figure 7) swing the retainers on the pivot pins 21 from the position shown by Figures 6 and 7 to the position shown by Figures 8 and 9 leaving a bar 2 free to fall into the channel of the feed guide 12a. The bars 2 are placed on the ramp 18b of the magazine similar to ramp 18 as in the previously described modification so that they can roll into the feed guide 12 when free, and the ramp 18b is preferably adjustable towards a cover plate 18a (Figure 8) to provide for different sizes of bars. In order that only one bar 2 will be free to fall into the channel of the feed guide 12a selectors 24 are mounted on some of the pins 21 and also mounted on pins 25 on the connecting rod 23, on which pins 25 the bar retainers are also mounted. When, therefore, the bar retainers are pivoted to allow a bar 2 to fall, the bar selectors moving in unison with the bar retainers move into position behind such bar and prevent any further bars 2 falling. A bar 2 is fed forward in the guide 12 step by step as in the previous construction by the chain 3 and pusher 9. When a bar 2 has been fed to a machine tool the pusher 9 is returned in the feed guide 12a and moves against and pivots a lever 26 mounted on a fixed pivot and pivoted to the connecting bar 23 to move the connecting bar to allow a bar 2 to drop into the guide 12 and when the pusher 9 has moved a short distance in the feed direction, the connecting bar 23 is moved in the return direction by the spring 27 and the bar retainers and bar selectors return to their original position.

The pusher 9 is adapted to be given a quick return and for this purpose the chain sprockets 4a and 8a are free wheel sprockets and when the pusher 9 reaches near the end of the feed movement it moves against a micro-switch 28a which switches on an electric motor 29 which drives the sprocket 8a at a quicker speed than the electric motor 5a driving the sprocket 4a. The sprocket wheel 8a is driven by a positive drive as the motor 29 does not drive through a slipping clutch as is the case with the drive to the sprocket wheel 4a. When the switch 28 is operated, the motor 29 is switched "on" and the motor 5a is switched "off" and also the electric motor driving the machine tool and the pusher 9 is moved on the quick return and at the end of the return movement operates the retainers and selectors to feed a bar 2 into the feed guide 12. At the commencement of the feed movement of the pusher 9 and when the bar 2 has entered the open collet 30 of the machine tool, the pusher 9 moves against a micro-switch 31 which switches off the motor 29 and stops the bar feed drive. The bar 2 is then "inched" up to the cutting tool of the machine tool and the machine tool motor switched "on." The feed motor 5a is automatically started after the collet 30 has closed.

Having thus described the invention, what is claimed as new and desired to be secured by Letters Patent is:

1. Means for automatically feeding bar stock to an automatic lathe or like machine tools, having a bar feed guide tube in which a bar to be fed to the machine tool is placed, means for feeding the bar to the machine tool comprising an endless chain mounted on chain sprocket wheels revolving about vertical axes, a horizontal bed on which the runs of the endless chain are supported, a pin on a link of the chain, a pusher mounted to reciprocate in the bar feed guide tube for engaging the end of said bar and slidably mounted in relation to said bed and having a slot engaged by said pin and along which the pin travels as it passes around said chain sprocket wheels, so that the pusher is reciprocated by the travel of the sprocket wheels in one direction, and power means driving the chain in the same direction of drive, a slipping friction clutch through which the power driving the chain for feeding said bar is transmitted so that a pressure is applied to said bar whether moving in the feed direction or held against movement by a stop or held in a clutch of the machine tool.

2. Means for automatically feeding bar stock to an automatic lathe or like machine tools, having a bar feed guide tube in which a bar to be fed to the machine tool is placed, means for feeding the bar to the machine tool comprising an endless chain mounted on chain sprocket wheels revolving about vertical axes, a horizontal bed on which the runs of the endless chain are supported, a pin on a link of the chain, a pusher mounted to reciprocate in the bar feed guide tube for engaging the end of said bar and slidably mounted in relation to said bed and having a slot engaged by said pin and along which the pin travels as it passes around said chain sprocket wheels, so that the pusher is reciprocated by the travel of the sprocket wheels in one direction, an electric motor for driving a chain sprocket wheel, a slipping friction clutch through which said motor drives the chain sprocket wheel to move the pusher in the feed direction so that a pressure is applied to said bar whether moving in the feed direction or held against movement by a stop or held in a clutch of the machine tool and a second electric motor for driving the chain to move the pusher in the return direction at a faster speed than the feed direction.

3. Means for automatically feeding bar stock to an automatic lathe or like machine tool as set forth in claim 2 having a switch device operated by the pusher for switching on the said second electric motor at the end of the bar feed movement and to switch off the electric motor driving the pusher in the feed direction, and a switch operated by the pusher to switch off said second electric motor at the commencement of the movement of the pusher device in the bar feed direction.

4. Means for automatically feeding bar stock to an automatic lathe or like machine tools, having a bar feed guide in which a bar to be fed to the machine tool is placed, means for feeding the bar to the machine tool comprising an endless chain mounted on chain sprocket wheels revolving about vertical axes, a horizontal bed on which the runs of the endless chain are supported, a pin on a link of the chain, a pusher mounted to reciprocate in the bar feed guide for engaging the end of said bar and slidably mounted in relation to said bed and having a slot engaged by said pin and along which the pin travels as it passes around said chain sprocket wheels, so that the pusher is reciprocated by the travel of the sprocket wheels in one direction, and means for driving the chain in the same direction of drive, a slipping friction clutch through which the power driving the chain for feeding said bar is transmitted so that a pressure is applied to said bar whether moving in the feed direction or held against movement by a stop or held in a clutch of the machine tool, and means for automatically feeding bars to the feed guide comprising a magazine for storing bars from which a bar is adapted to fall by gravity into the bar feed guide, a bar retainer member or members for closing the feed guide and forming a stop for the next bar to be fed, a selector device for holding back the bars in the magazine whilst a bar is fed into the feed guide, such bar retainer and bar selector device comprising a plurality of pairs of arms mounted on a fixed pivot, a connecting rod on which the said bar retainers and bar selectors are mounted, a pivoted lever operated by the pusher at the end of its return movement for moving the connecting rod to pivot said bar retainer and selector arms into position for feeding a bar into the bar feed guide and a spring for returning the connecting rod at the commencement of the movement of the pusher in the feed direction.

5. Means for automatically feeding bar stock to an automatic lathe or like machine tools, having a bar feed guide tube in which a bar to be fed to the machine tool is placed, a removable cover for the bar feed guide tube arranged on a slide bar, a stationary slide guide arranged at an inclination to the vertical, and a pin and slot connection between the slide bar and the slide guide with the slot inclined to the horizontal, and means for pushing the slide bar endwise to lift such slide bar and the cover for the bar feed guide, means for feeding the bar to the machine tool comprising an endless chain mounted on chain sprocket wheels revolving about vertical axes, a horizontal bed on which the runs of the endless chain are supported, a pin on a link of the chain, a pusher mounted to reciprocate in the bar feed guide tube for engaging the end of said bar and slidably mounted in relation to said bed and having a slot engaged by said pin and along which the pin travels as it passes around said chain sprocket wheels, so that the pusher is reciprocated by the travel of the sprocket wheels in one direction, and power means for driving the chain in the same direction of drive, a slipping friction clutch through which the power driving the chain for feeding said bar is transmitted so that a pressure is applied to said bar whether moving in the feed direction or held against movement by a stop or held in a clutch of the machine tool.

References Cited in the file of this patent

UNITED STATES PATENTS

| | | |
|---|---|---|
| 1,956,999 | Rupple | May 1, 1934 |
| 2,108,274 | Tautz | Feb. 14, 1938 |
| 2,577,203 | Mariotte | Dec. 4, 1951 |
| 2,595,522 | Harney | May 6, 1952 |